United States Patent Office 2,788,534
Patented Apr. 16, 1957

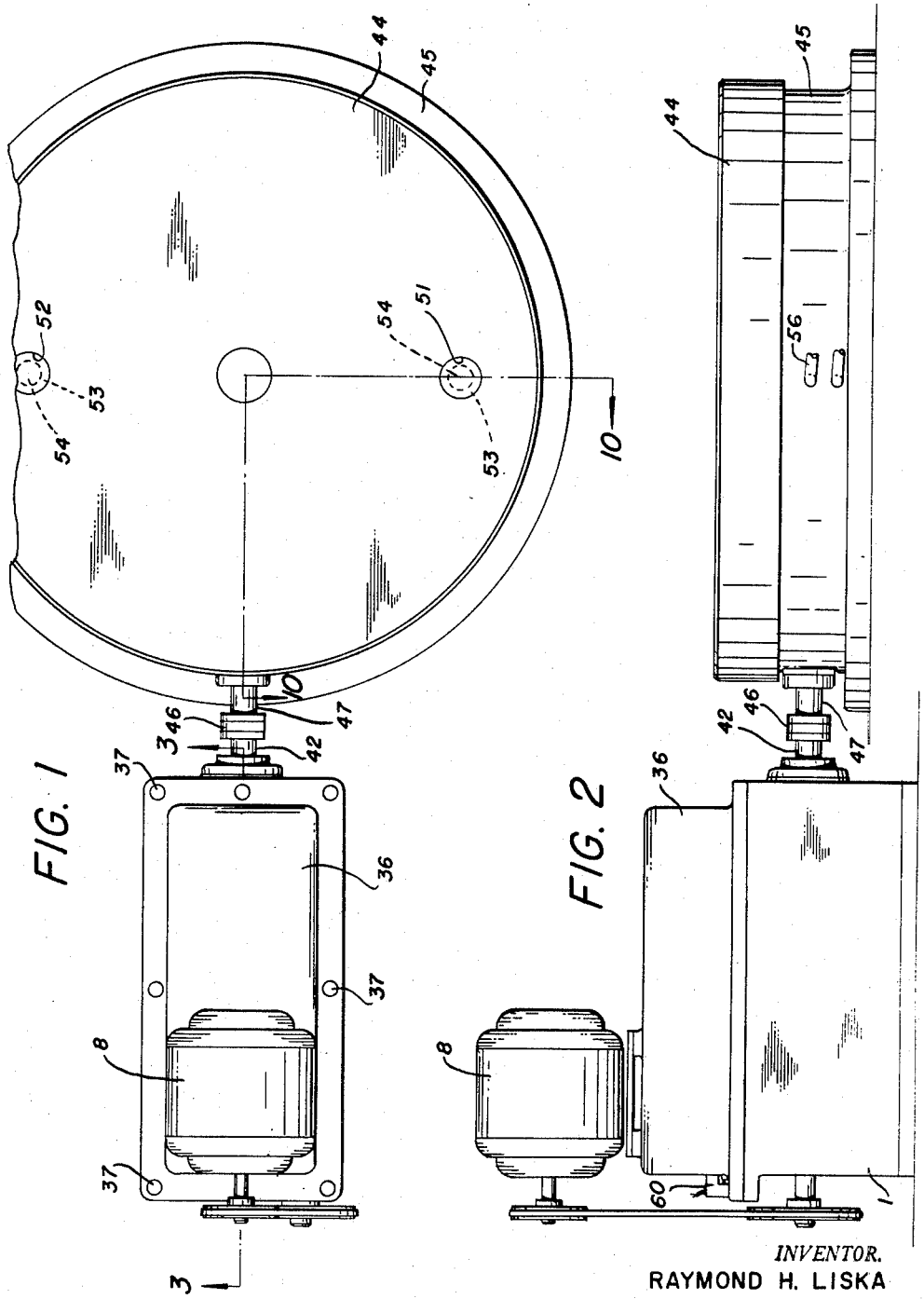

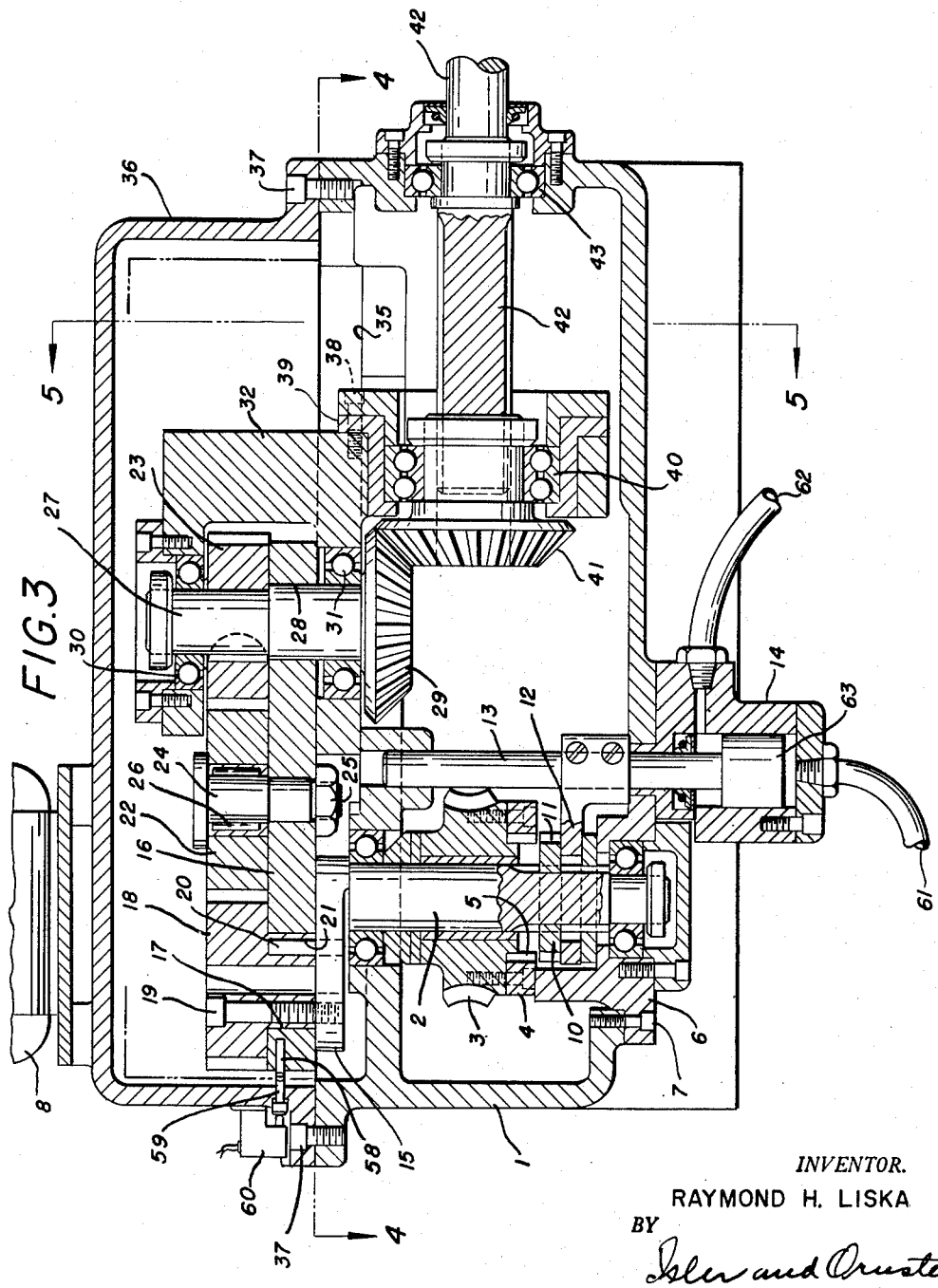

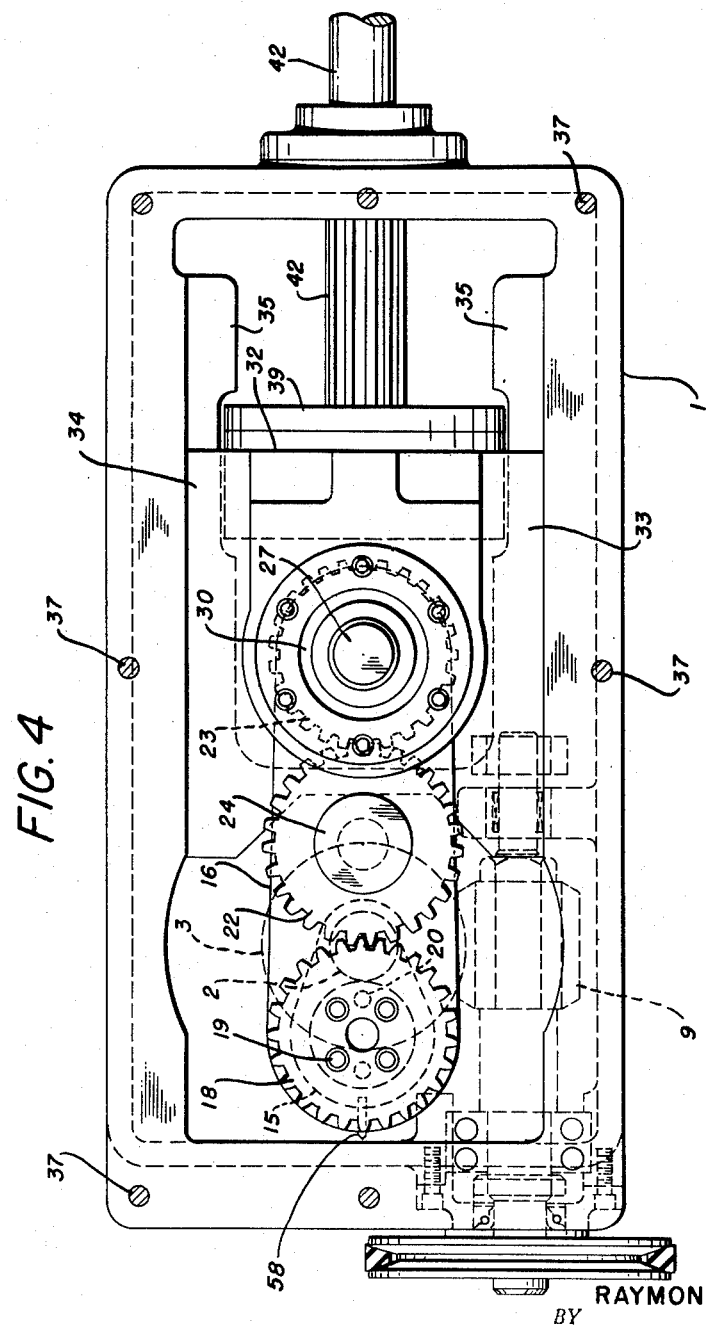

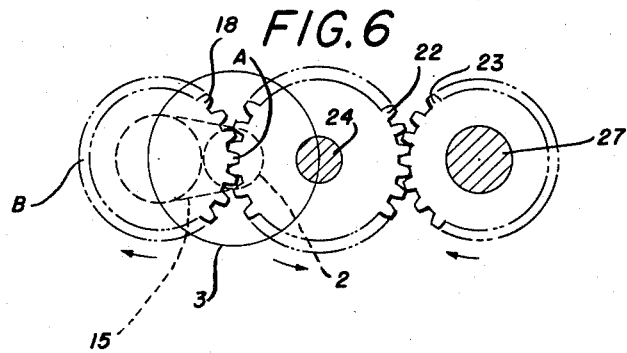
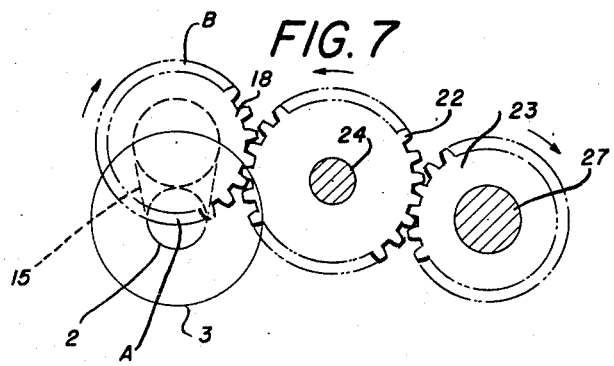
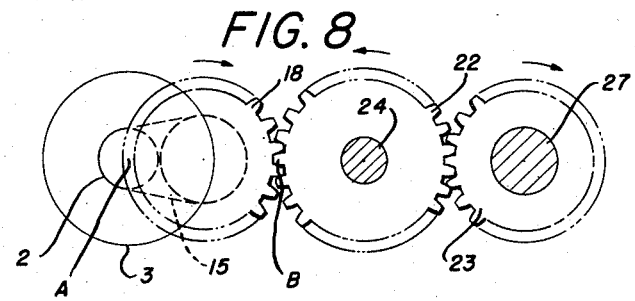
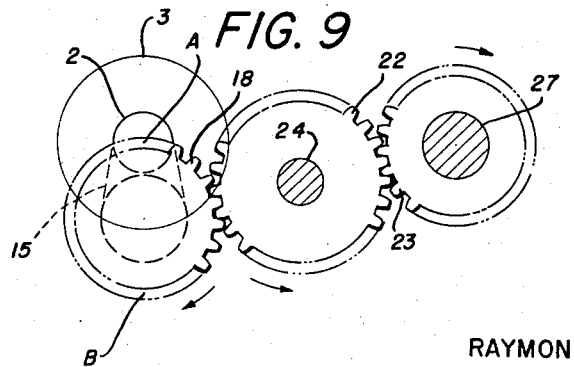

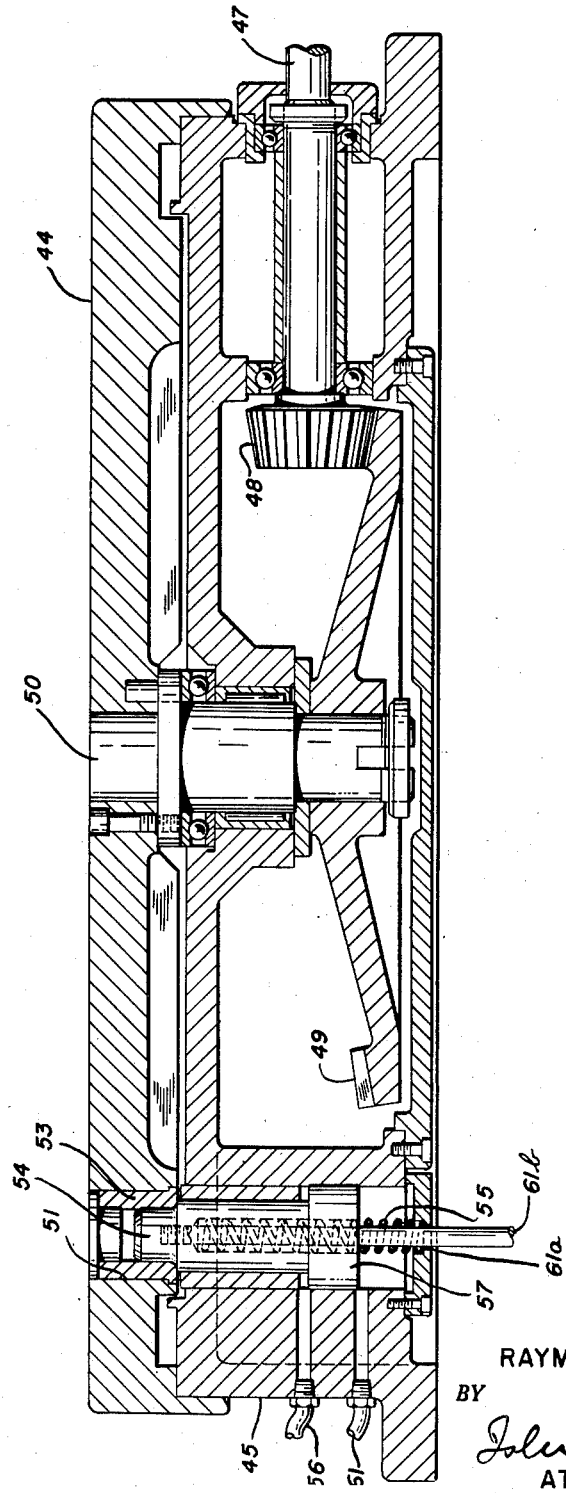

2,788,534

MECHANISM FOR IMPARTING ROTARY MOTION TO INDEX TABLES AND THE LIKE

Raymond H. Liska, Cleveland, Ohio, assignor to The Cleveland Universal Jig Company, Cleveland, Ohio, a corporation of Ohio Application December 8, 1953, Serial No. 396,942

13 Claims. (Cl. 74—393)

This invention relates generally to mechanism or means for imparting rotary movement to index tables and the like, but has reference more particularly to a mechanism which will impart a movement which is not uniform or constant throughout the cycle of rotation.

Index tables and the like are usually mounted for rotation about a base, the rotation being usually effected through the intermediary of various shafts, gears and couplings. Conventionally, also, these index tables are provided at circumferentially-spaced points, which define stations of the table, and which are adapted to receive an index pin, for the purpose of locking the table to the base, when work, which is mounted on the table, is to have various machining or other operations performed on it.

The table itself is usually massive and very heavy, and this, plus the work supported on the table, provides a large mass which is somewhat difficult to rotate. Rotation of such a mass at a uniform speed between stations of the table is not only difficult, but is apt to impart shock to various parts of the table, as well as introducing the possibility of shifting of the work on the table, if not rigidly clamped or otherwise supported on the table.

The present invention has as its primary object the provision of a mechanism which will impart an intermittent rotary motion to an index table or the like, without shock, and yet keep the table under positive control throughout the cycle.

Another object of the invention is to provide a mechanism of the character described, which will impart to the index table or the like a rotary motion or movement which gradually varies from a zero velocity or speed at one station to a maximum speed or velocity at a point midway between that station and the next station, and back to zero speed or velocity at the next station.

A further object of the invention is to provide a mechanism of the character described which consists of a minimum number of parts that can be manufactured and assembled at relatively low cost, which does not require frequent repair or replacement of parts, but the parts of which are readily accessible for repair or replacement, if necessary.

Other objects and advantages of my invention will be apparent during the course of the following description.

In the accompanying drawings forming a part of this specification and in which like numerals are employed to designate like parts throughout the same, Fig. 1 is a top plan view of an index table and mechanism for rotating the same, which mechanism embodies the principal features of the invention;

Fig. 2 is a front elevational view of the table and mechanism shown in Fig. 1;

Fig. 3 is a cross-sectional view of the rotating mechanism, on an enlarged scale, taken on the line 3—3 of Fig. 1;

Fig. 4 is a cross-sectional view, taken on the line 4—4 of Fig. 3;

Fig. 6 is a view illustrating, more or less diagrammatically, the position of the critical parts of the driving mechanism at the beginning of a cycle of rotation of the index table, i. e., rotation from one station to the next.

Fig. 7 is a view similar to Fig. 6, but illustrating the position of the parts after the drive shaft has rotated 90 degrees;

Fig. 8 is a view similar to Fig. 7, but illustrating the position of the parts after the drive shaft has rotated 180 degrees;

Fig. 9 is a view similar to Fig. 8, but illustrating the position of the parts after the drive shaft has rotated 270 degrees, and Fig. 10 is a cross-sectional view of the index table, taken on the line 10—10 of Fig. 1.

Figure 5:
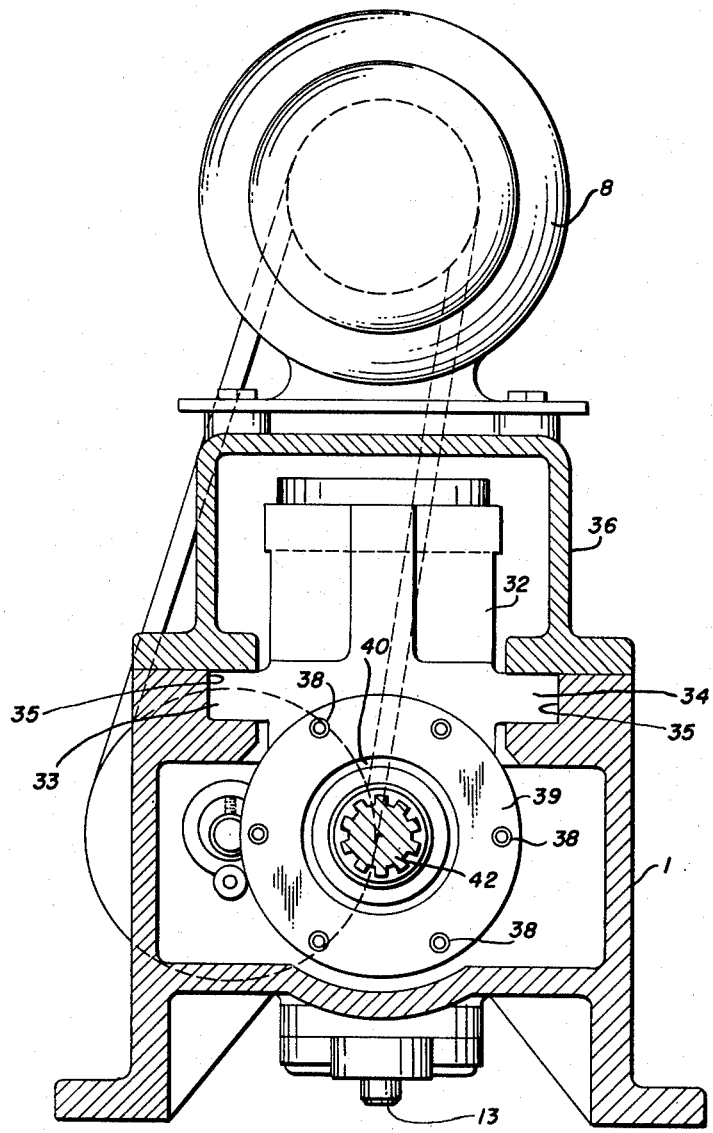
Fig. 5 is a transverse cross-sectional view, taken on the line 5—5 of Fig. 3.

Referring more particularly to Figs. 1 to 9 inclusive of the drawings, reference numeral 1 designates generally a housing or casing, in which a vertical shaft 2 is journalled for rotation.

The shaft 2 is adapted to be rotated by a worm wheel 3, which surrounds the shaft 2, and has secured to its lower face a ring gear 4 having internal teeth 5. The gear 4 is supported on an annular member 6, which is rigidly secured to the housing 1 by means of screws 7. The worm wheel 3 is continuously driven by an electric motor 8 through a worm 9.

Keyed to the lower portion of shaft 2 is a clutch member 10 provided with gear teeth 11 which are adapted to be moved into driving engagement with the ring gear 5 at such times when it is desired to drive shaft 2. Upward movement of the clutch member 10 for this purpose may be effected in a number of ways, but I prefer to use a clutch fork 12, which is clamped to a shaft 13, the ends of which are journalled in the housing 1, and which is adapted to be moved vertically by means of an air cylinder 14.

The upper end of the shaft 2 is provided with a crank arm 15, on which one end of a link or arm 16 rests. The link or arm 16 is of generally elliptical shape or form, and has journalled in an opening 17 thereof a drive gear 18, which is rigidly secured to the crank arm 15 by means of screws 19, the gear being secured against rotation relatively to the crank arm by means of dowel pins 20 extending from the crank arm into an opening 21 of the gear. The axis of the shaft 2 intersects the pitch circle of the gear 18 and this relationship remains constant throughout the operation of the device, which will be presently described.

The gear 18 drives an idler gear 22, which, in turn, drives a third or driven gear 23, which is identical in size with the gear 18. The gears 18, 22 and 23 lie in the same plane, and their axes lie in a common vertical plane. The gears 18, 22 and 23 lie on the upper surface of the link 16, and each is free to rotate relatively to the link 16.

The gear 22 is removably secured to the link 16 by means of a pin 24 and nut 25, a roller bearing 26 being interposed between the gear and pin to permit free rotation of the gear.

The driven gear 23 has keyed thereto a vertical shaft 27, which extends through the center of the gear and through an opening 28 in the link 16, and is provided at its lower end with a bevel gear 29. The shaft 27 is journalled for rotation in bearings 30 and 31 in a gear box 32 which is mounted for reciprocal longitudinal movement in the housing 1. The gear box 32 is provided with laterally extending ribs 33 and 34 which extend into guideways 35 in the housing 1, and which confine the gear box to a rectilinear movement, irrespective of the movement of the drive plate 16.

A cover 36 is removably secured to the housing 1, as by means of screws 37, and this cover, as best shown in Fig. 5, maintains the ribs 33 and 34 of the gear box 32 against vertical displacement from the guideways 35.

The gear box 32 has secured thereto, as by means of screws 38, a housing 39 for a bearing 40, in which a bevel gear 41 is journalled, which gear is driven by bevel gear 29.

The gear 41 is splined to a shaft 42, which is journalled for rotation in a bearing 43 in the housing 1, this splined connection permitting longitudinal movement of the gear 41 along the shaft 42 without interruption of the driving connection between this gear and shaft.

Referring now to Figs. 1, 2, 3 and 10 of the drawings, the mechanism, as described, is illustrated as adapted for the rotation of an index table 44. This index table is mounted for rotation on a base 45. Rotation is effected by the shaft 42 through the intermediary of coupling 46, shaft 47, bevel pinion 48, bevel gear 49 and a shaft 50 secured to the center of the table 44.

The table 44 is provided at circumferentially-spaced points with recesses 51 and 52, in which are mounted bushings 53, which are adapted to receive the index pin 54, for the purpose of locking the table to the base 45. The recesses 51 and 52 define stations of a two-station table, and in this case, are 180 degrees apart. It will be readily understood, however, that the table may be provided with any desired number of such recesses, defining additional stations.

The index pin 54 may be actuated in any desired or conventional manner. In this case, the index pin is automatically moved into locking position by means of a compression coil spring 55, and is retracted by means of compresesd air which enters the base 45 through a conduit 56, to exert pressure on the piston-like head 57 of the pin 54.

The driving mechanism which has been described is designed to rotate the index table between stations, but in view of the large mass which is to be thus moved, it is desirable to impart to the table a rotary motion which gradually varies from a zero velocity or speed at one station to a maximum speed or velocity at a point midway between that station and the next station, and back to zero speed or velocity at the next station. It is desirable, in other words, to produce an intermittent rotary motion which will start and stop the index table without shock and yet keep the table under positive control throughout the cycle.

Such a motion has been obtained in some instances by the practical application of the mathematical curve known as the epicycloid, which is the curve traced by a point on a circle as the latter revolves on the outside of another fixed circle.

In the present case, the motion is obtained through a modification of such an application, which I have found to be productive of greatly improved results.

The gear ratios in my device are such that one complete revolution of the shaft 2 will produce a half revolution of the index table 44, which is equivalent to rotation of the table between its two stations.

The shaft 2 drives the shaft 42 through the intermediary of the crank arm 15, gear 18, 22 and 23, shaft 27, and bevel gears 29 and 41.

The movement will be better understood by references to Figs. 6, 7, 8 and 9, wherein Fig. 6 shows the relationship between the shaft 2, and gears 18, 22 and 23 at the beginning of the rotary movement (which is the position of the parts shown in Figs. 3 and 4), Fig. 7 shows the relationship of these parts after shaft 2 has been rotated 90 degrees in a clockwise direction, Fig. 8 shows the relationship of the parts after shaft 2 has been rotated 180 degrees, Fig. 9 shows the relationship of the parts after shaft 2 has been rotated 270 degrees, and Fig. 6 shows the relationship of the parts after shaft 2 has been rotated 360 degrees (the parts being again in their original position).

In Fig. 6, the velocity of the gear 18 is zero, and from this point until the parts are in the position shown in Fig. 7, the velocity increases gradually, but relatively slowly. From the position shown in Fig. 7 to that shown in Fig. 8, the velocity increases more rapidly, reaching a maximum when the parts are in the position shown in Fig. 8. From the position shown in Fig. 8 to that shown in Fig. 9, the velocity changes in the same manner as from Fig. 7 to Fig. 8, but is a decelerated velocity. From the position shown in Fig. 9 to the return to the position shown in Fig. 6, the velocity decreases more rapidly, until the velocity is again zero when the parts are in the position shown in Fig. 6.

This may be explained by reference to Figs. 6 to 9. In Fig. 6, the point A on the periphery of the gear 18 is coincident with the axis of rotation of the shaft 2, and this relationship persists throughout the ensuing orbital movement of the gear 18 about the shaft. A second point B, on the gear 18, which is diametrically opposite point A, will also be considered.

It will be noted that the point A will have a peripheral speed of substantially zero during orbital movement of the gear 18, whereas point B, which is radially furthest removed from the axis of shaft 2, will have a greater peripheral velocity than any other point on the periphery of gear 18.

Any selected peripheral points or teeth on gear 18, which are intermediate the points A and B, will have a peripheral velocity greater than that of A and less than that of B.

Therefore, when the gears are in the position shown in Fig. 6, the gear 18 imparts no movement to the gear train.

As the gear 18 rotates orbitally in the direction indicated by the arrow, it also has an effective axial rotation in relation to the gear 22, thereby resulting in successive interengagement of the teeth on gears 18 and 22 to cause axial rotation of the gear 22 in a counter-clockwise direction shown by the arrow. The gear 23 has an equivalent clockwise axial rotation, thus rotating shaft 27.

Each successive tooth on gear 18 between points A and B has a greater peripheral speed than its preceding teeth, so that the axial rotation of gear 22 is constantly accelerated as gear 18 rotates.

In Fig. 7 is shown the position of the gear train after gear 18 has been rotated orbitally and axially through 90 degrees of arc. The points A and B have been rotated 90 degrees from the position shown in Fig. 6, and the gear train, supported on link 16, has pivoted clockwise about shaft 27 and has also shifted linearly rearwardly in response to movement of the crank arm 15. The radial distance, from the axial point A to the engaged tooth on gear 18 is slightly less than one-half the radial distance from point A to point B, so that the peripheral speed of this engaged tooth is slightly less than one-half the maximum peripheral speed of the gear 18, which occurs at point B.

As gear 18 continues its rotation to the position shown in Fig. 8, the peripheral velocity of its engaging teeth steadily increases and reaches its maximum when point B is engaged, after 180 degrees of rotation from the position shown in Fig. 6. The crank arm movement has shifted link 16 outwardly to tis maximum displacement and has pivoted it counter-clockwise to return it to its original position of angularity.

Further rotation of the gear 18 causes its teeth to engage successively from point B toward point A. Therefore the peripheral velocity of the engaging teeth steadily decreases from the maximum obtained in Fig. 8. As the gear 18 reaches 270 degrees of angular rotation, the position of the parts is as shown in Fig. 9, wherein the gear train has been pivoted in a counter-clockwise direction and has been drawn linearly forwardly by the crank arm. In this position, the peripheral velocity of the engaged tooth on gear 18 is the same as it was in the position shown in Fig. 7.

Continued rotation of gear 18 is accompanied by rapidly diminishing speed of the successively engaged teeth until the parts return to their original position shown in Fig. 6, at which time minimum peripheral tooth velocity of zero is attained.

It will be readily understood that the gear 23 has been rotated 360 degrees in response to the above-described cycle of rotation of crank arm 15 and gear 18.

In Figs. 2, 3 and 4, means are shown, somewhat diagrammatically, for automatically retracting the index pin 54 at the beginning of the cycle of rotation of the shaft 2 and for automatically returning the index pin to locking position at the conclusion of this cycle. Such means comprises a pin 58 which projects from the end of the link 16, a pin 59 slidably mounted in the cover 36, and a switch 60.

Referring to Figs. 3 and 10, it will be noted that the air cylinder 14 is provided with two conduits 61 and 62, conduit 61 in Fig. 3 being a continuation of this conduit shown in Fig. 10. An air vent is shown at 61a and a pull rod at 61b. Conduit 56 (Fig. 10) and conduit 62 (Fig. 3) are connected to a four way electrically operated air valve, normally deenergized (but not shown), so as to admit compressed air through conduit 62 (Fig. 3) into the upper chamber of the air cylinder 14 (Fig. 3), thereby keeping clutch 5 and 11 disengaged and letting air escape through conduit 56 (Fig. 10) and through said air valve. This permits spring 55 (Fig. 10) to keep the index pin 54 in the locking position shown.

In order to start an indexing cycle, an electric manually operated push button (not shown) will energize the aforesaid electric four way valve, thereby reversing the compressed air flow. Air will now flow through conduit 56 (Fig. 10) into the upper chamber of the index pin cylinder, thereby disengaging index pin 54 (Fig. 10). When the index pin is safely disengaged, the upper surface of piston 57 will uncover the air port to which conduit 61 is attached and carry compressed air through conduit 61 into the lower chamber of air cylinder 14 (Fig. 3), forcing piston 63 up, thereby engaging clutch teeth 5 and 11. Since the worm wheel 3 is in constant motion, the index cycle is started and continues until pin 58 again cams past pin 59, which, through switch 60, deenergizes the four way air valve reversing the compressed air flow, disengaging the clutch teeth and engaging the index pin. This completes the index cycle, during which gear 23 will have revolved one revolution, from zero to zero motion.

The aforesaid method of operation provides an interlock feature which at no time permits simultaneous engagement of the index pin and drive clutch which might cause breakage of parts.

The pull rod 61b is provided for the purpose of manually disengaging the index pin during job set-up or checking.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

Having thus described my invention, I claim:

1. In a mechanism for rotating an index table in a predetermined pattern of speed, a drive shaft having a crank arm, a first gear rigidly secured to said crank arm and having its axis spaced from and parallel with the axis of said shaft, a link pivotally secured to said crank arm coaxially with said first gear and reciprocably movable relatively to said drive shaft in response to rotation of said crank arm, an idler gear rotatably secured to said link in mesh with said first gear, a third gear rotatably secured to said link in operative engagement with said idler gear and reciprocably movable with said link, and means operatively connecting said third gear to said index table.

2. Mechanism, as recited in claim 1, in which the axis of the drive shaft intersects the pitch circle of the first gear.

3. Mechanism, as recited in claim 1, in which the third-named gear is of the same size and has the same number of teeth as said first gear.

4. Mechanism, as recited in claim 1, in which said means includes a gear box mounted for reciprocal movement relatively to said drive shaft, power transmission means mounted in said gear box and operatively connected to said third gear, and connecting means securing said gear box to said link for reciprocal movement in response thereto.

5. Mechanism, as recited in claim 4, in which said power transmission means includes bevel gears driven by said third gear, and a splined shaft driven by one of said bevel gears, said bevel gear being reciprocally movable along said splined shaft in response to link-responsive movement of said gear box.

6. Mechanism, as recited in claim 5, including a power-driven rotatable member, and a clutch selectively connecting said member to said drive shaft.

7. In a mechanism of the character described, a housing, a gear box mounted for reciprocable movement in said housing, interengaging bevel gears rotatably supported in said gear box, and means for reciprocating said gear box, said means comprising a shaft rotatably mounted in said housing, a crank arm on said shaft, a link pivotally connected to said gear box and to said crank arm, a first gear fixed to said crank arm with the axis of said shaft intersecting the pitch circle of said gear, and means for transmitting rotation of said first gear to said bevel gears.

8. Mechanism, as defined in claim 7, in which said last-named means includes an idler gear rotatably mounted on said link in mesh with said first gear.

9. Mechanism, as defined in claim 8, in which said last-named means includes a third gear rotatably mounted on said link in mesh with said idler gear and operatively connected to one of said bevel gears.

10. Mechanism, as defined in claim 9, including a spined shaft rotatably mounted in said housing, one of said bevel gears being slidably secured to said splined shaft for rotation therewith and being reciprocably movable along the splined shaft in response to reciprocal movement of said gear box.

11. In a mechanism for indexing a rotatable index table, a constant speed rotary drive member, a variable speed power transmission operatively engaging the index table to effect rotation thereof, selectively operable locking means engageable with the index table to secure said table against rotation, and clutch means, operative in response to disengagement of said locking means, connecting said drive member to said power transmission.

12. A mechanism, as defined in claim 11, wherein said variable speed power transmission includes a drive shaft, a crank arm provided on said drive shaft, a first gear fixedly secured to said crank arm for orbital movement about said drive shaft, a movable link pivotally secured to said drive shaft coaxially with said first gear for reciprocable movement relatively to said drive shaft, a second gear rotatably secured to said link in operative engagement with said first gear, a third gear rotatably secured to said link in operative engagement with said second gear, said second gear and third gear being reciprocable relatively to said drive shaft in response to reciprocable movement of said link, and means operatively connected to said third gear for rotating said index table, whereby said index table will rotate in a sequential minimum-maximum-minimum speed cycle in response to one revolution of said crank arm.

13. In a mechanism for effecting a predetermined variation of angular velocity in a rotatable driven member, a drive shaft adapted to be rotated at a uniform velocity, a crank arm secured to said drive shaft for rotation therewith, a first gear rigidly secured to said crank arm and having its axis parallel to the axis of said drive shaft, a link having one end thereof pivotally secured to said crank arm coaxially with said first gear and reciprocably movable relatively to said drive shaft in response to rotation of said crank arm, an idler gear rotatably secured in said link in mesh with said first gear, rectilinear guide means engaging the other end of said link to define a linear path of movement therefor, and power transmission means secured to said link for movement therewith and operatively connected to said idler gear for engagement with a rotatable driven member.

References Cited in the file of this patent

UNITED STATES PATENTS 1,052,542     Widmer _____ Feb. 11, 1913

FOREIGN PATENTS 703,540     France _____ May 1, 1931